US007289125B2

(12) United States Patent  
Diard et al.

(10) Patent No.: US 7,289,125 B2
(45) Date of Patent: Oct. 30, 2007

(54) GRAPHICS DEVICE CLUSTERING WITH PCI-EXPRESS

(75) Inventors: Franck R. Diard, Mountain View, CA (US); David G. Reed, Saratoga, CA (US); Gary D. Hicok, Mesa, AZ (US); Michael Brian Cox, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 273 days.

(21) Appl. No.: 10/789,248

(22) Filed: Feb. 27, 2004

(65) Prior Publication Data

US 2005/0190190 A1 Sep. 1, 2005

(51) Int. Cl.
*G06F 15/00* (2006.01)
*G06F 15/16* (2006.01)

(52) U.S. Cl. .................. 345/501; 345/502; 345/504
(58) Field of Classification Search ................ 345/501, 345/502, 504; 710/305, 306; 713/1, 2
See application file for complete search history.

(56) References Cited

U.S. PATENT DOCUMENTS

| 5,790,130 | A  |   | 8/1998  | Gannett         |         |
| 5,790,849 | A  | * | 8/1998  | Crocker et al.  | 713/2   |
| 5,841,444 | A  |   | 11/1998 | Mun et al.      |         |
| 6,023,281 | A  |   | 2/2000  | Grigor et al.   |         |
| 6,078,339 | A  | * | 6/2000  | Meinerth et al. | 345/522 |
| 6,191,800 | B1 |   | 2/2001  | Arenburg et al. |         |
| 6,259,461 | B1 |   | 7/2001  | Brown           |         |
| 6,266,072 | B1 | * | 7/2001  | Koga et al.     | 345/505 |
| 6,317,133 | B1 |   | 11/2001 | Root et al.     |         |
| 6,362,818 | B1 |   | 3/2002  | Gardiner et al. |         |

(Continued)

FOREIGN PATENT DOCUMENTS

EP 0571969 5/2003

(Continued)

OTHER PUBLICATIONS

Whitman, "Dynamic Load Balancing For Parallel Polygon Rendering" IEEE Computer Graphics and Applications, IEEE Inc. New York, U.S. vol. 14, No. 4, pp. 41-48, Jul. 1, 1994.

(Continued)

*Primary Examiner*—Kee M. Tung
*Assistant Examiner*—Joni Hsu
(74) *Attorney, Agent, or Firm*—Townsend and Townsend and Crew, LLP

(57) ABSTRACT

A bridge associated with a broadcast aperture facilitates the transfer of rendering commands and data between a processor and multiple graphics devices. The bridge receives data written by the processor to the broadcast aperture and forwards it to multiple graphics devices, eliminating the need for the processor to perform duplicative(?) write operations. During system initialization, a broadcast aperture is allocated to the bridge in address space based on an aperture size value set using a system configuration utility and stored in system configuration memory. A graphics driver activates the broadcast aperture by sending unicast aperture parameters associated with the multiple graphics devices to the bridge via a bridge driver. Upon activating the broadcast aperture, multiple graphics devices can be operated in parallel to improve rendering performance. Parallel rendering techniques include split-frame, alternate frame, and combined split- and alternate frame rendering.

22 Claims, 8 Drawing Sheets

U.S. PATENT DOCUMENTS

| | | |
|---|---|---|
| 6,445,391 B1 | 9/2002 | Sowizral et al. |
| 6,469,746 B1 | 10/2002 | Maida |
| 6,473,086 B1 | 10/2002 | Morein et al. |
| 6,570,571 B1 | 5/2003 | Morozumi |
| 6,724,390 B1 | 4/2004 | Dragony et al. |
| 6,747,654 B1 | 6/2004 | Laksono et al. |
| 6,781,590 B2 | 8/2004 | Katsura et al. |
| 6,789,154 B1 * | 9/2004 | Lee et al. .................. 710/315 |
| 2003/0128216 A1 | 7/2003 | Walls et al. |
| 2004/0075623 A1 | 4/2004 | Hartman |
| 2004/0179007 A1 * | 9/2004 | Bower et al. ............... 345/419 |
| 2004/0181806 A1 * | 9/2004 | Sullivan ...................... 725/73 |
| 2005/0012749 A1 | 1/2005 | Gonzalez |
| 2005/0088445 A1 | 4/2005 | Gonzalez |

OTHER PUBLICATIONS

Molnar et al., "PixelFlow: HighSpeed Rendering Using Image Composition", SIGGRAPH 92, pp. 231-240.

* cited by examiner

600

650 655

GRAPHICS DEVICE CLUSTERING WITH PCI-EXPRESS

CROSS-REFERENCES TO RELATED APPLICATIONS

This application is related to the following patent applications, the disclosure of which are incorporated by reference herein for all purposes: "Adaptive Load Balancing in a Multi-Processor Graphics Processing System," U.S. patent application Ser. No. 10/642,905, filed Aug. 18, 2003; "Programming Multiple Chips from a Command Buffer," U.S. patent application Ser. No. 10/639,893, filed Aug. 12, 2003; and "Private Addressing in a Multi-Processor Graphics Processing System," U.S. patent application Ser. No. 10/643,072, filed Aug. 18, 2003.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

To maximize rendering performance, the graphics processing subsystem may include two or more graphics processing units (GPUs) operating in parallel. The graphics processing units can divide the rendering workload in a number of different ways. For example, different portions of an image can be rendered in parallel by different GPUs. The portions are then combined to produce a complete rendered image. In another example parallel rendering scheme, each GPU renders one image in a sequence of images.

Transferring rendering commands and data with a CPU to two or more GPUs is one difficulty arising from parallel rendering schemes. In many parallel rendering schemes, the same rendering commands and data need to be distributed to all of the GPUs; however, the CPU typically communicates rendering commands and data via a CPU bus to each GPU separately. Thus, the bandwidth required to operate multiple GPUs scales linearly with the number of GPUs. Because the bandwidth of the CPU bus is limited, a system with two or more GPUs operating in parallel will saturate the CPU bus. In these situations, the CPU bus is the limiting factor in overall graphics performance, and additional GPUs will not provide any performance improvement. Furthermore, having the CPU communicate the same rendering commands and data with each GPU separately wastes CPU cycles; for example, requiring the CPU to write the same rendering commands and data several times.

Therefore, it is desirable to have an efficient system and method for transferring rendering commands and data between the CPU and multiple graphics processing units operating in parallel. It is further desirable to eliminate the CPU bus as a potential graphics performance bottleneck in operating multiple graphics processing units. It is also desirable to reduce the number of wasteful CPU cycles needed to communicate with multiple graphics processing units in the graphics processing subsystem.

BRIEF SUMMARY OF THE INVENTION

The invention includes a bridge associated with a broadcast aperture for facilitating the transfer of rendering commands and data between a processor and multiple graphics devices. The bridge receives data written by the processor to the broadcast aperture and forwards it to multiple graphics devices, eliminating the need for the processor to perform multiple write operations and possibly saturating the processor bus. During system initialization, a broadcast aperture is allocated to the bridge in address space based on an aperture size value set using a system configuration utility and stored in system configuration memory. A graphics driver activates the broadcast aperture by sending unicast aperture parameters associated with the multiple graphics devices to the bridge via a bridge driver. Upon activating the broadcast aperture, multiple graphics devices can be operated in parallel to improve rendering performance. Parallel rendering techniques include split-frame, alternate frame, and combined split- and alternate frame rendering.

An embodiment of the invention configures a broadcast aperture adapted to transfer data between a processor and a plurality of graphics devices by receiving allocation data for a broadcast aperture in a physical address space. A bridge is configured with a first set of configuration data. The bridge is adapted to facilitate transferring data between a processor and a plurality of graphics devices. A bridge is further configured with a second set of configuration data, thereby activating the broadcast aperture. In an additional embodiment, at least one of the plurality of graphics devices includes a plurality of graphics processing units.

In another embodiment, configuring a bridge with a first set of configuration data includes retrieving at least a portion of the first set of configuration data from a system configuration memory. In one implementation, this portion of the configuration data includes a broadcast aperture size. The broadcast aperture size may be set by a user via a BIOS configuration utility. In a further embodiment, the first set of configuration data is stored in a set of registers included in the bridge.

In yet another embodiment, configuring the bridge with a second set of configuration data includes receiving at least a portion of the second set of configuration data from a graphics driver associated with the plurality of graphics devices. In a further embodiment, the portion of the second set of configuration data includes a set of physical base addresses for a set of unicast apertures. Each physical base address is associated with one of the plurality of graphics devices. The second set of configuration data is stored in a set of registers included in the bridge.

In yet a further embodiment, the processor executes a graphics driver adapted to communicate a set of rendering commands and rendering data to the plurality of graphics devices via the broadcast aperture. In one implementation, the set of rendering commands directs a first portion of the plurality of graphics devices to render a first portion of a frame and directs a second portion of the plurality of graphics devices to render a second portion of the frame. In another embodiment, the set of rendering commands directs a first portion of the plurality of graphics devices to render a first frame and directs a second portion of the plurality of graphics devices to render a second frame. In an implementation, the set of rendering commands direct a first portion of the plurality of graphics devices to transfer rendered image data comprising at least a portion of a frame to one of the plurality of graphics devices connected with a display device. The first portion of the plurality of graphics devices may be adapted to transfer rendered image data to the one of the plurality of graphics devices connected with a display device via a graphics bus using a blit operation. In another implementation, the first portion of the plurality of graphics devices is adapted to transfer rendered image data to the one of the plurality of graphics devices connected with a display device via a digital video connection. The rendered image data may include an anti-aliased version of at least a portion of a frame. Additionally, the rendered image data may be associated with a complex portion of a frame.

BRIEF DESCRIPTION OF THE DRAWINGS

The invention will be described with reference to the drawings, in which.

DETAILED DESCRIPTION OF THE INVENTION

Figure 1:
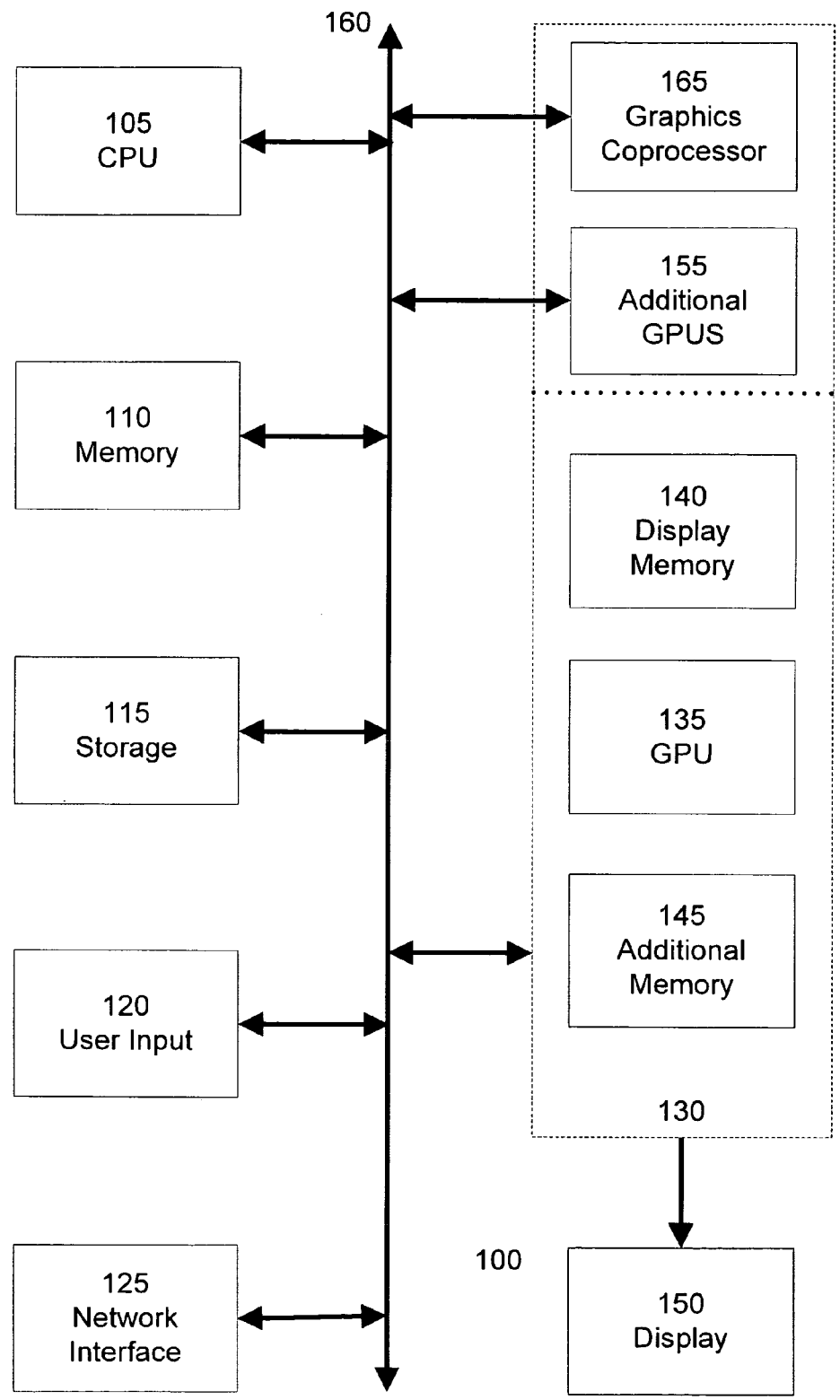
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X (also known as 3GIO), and HyperTransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same circuit board as GPU 135 and sharing a connection with GPU 135 to data bus 160, or can be located on additional circuit boards separately connected with data bus 160. Additional GPUs 155 can also be integrated into the same module or chip package as GPU 135. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip used to control the data bus 160.

Figure 2:
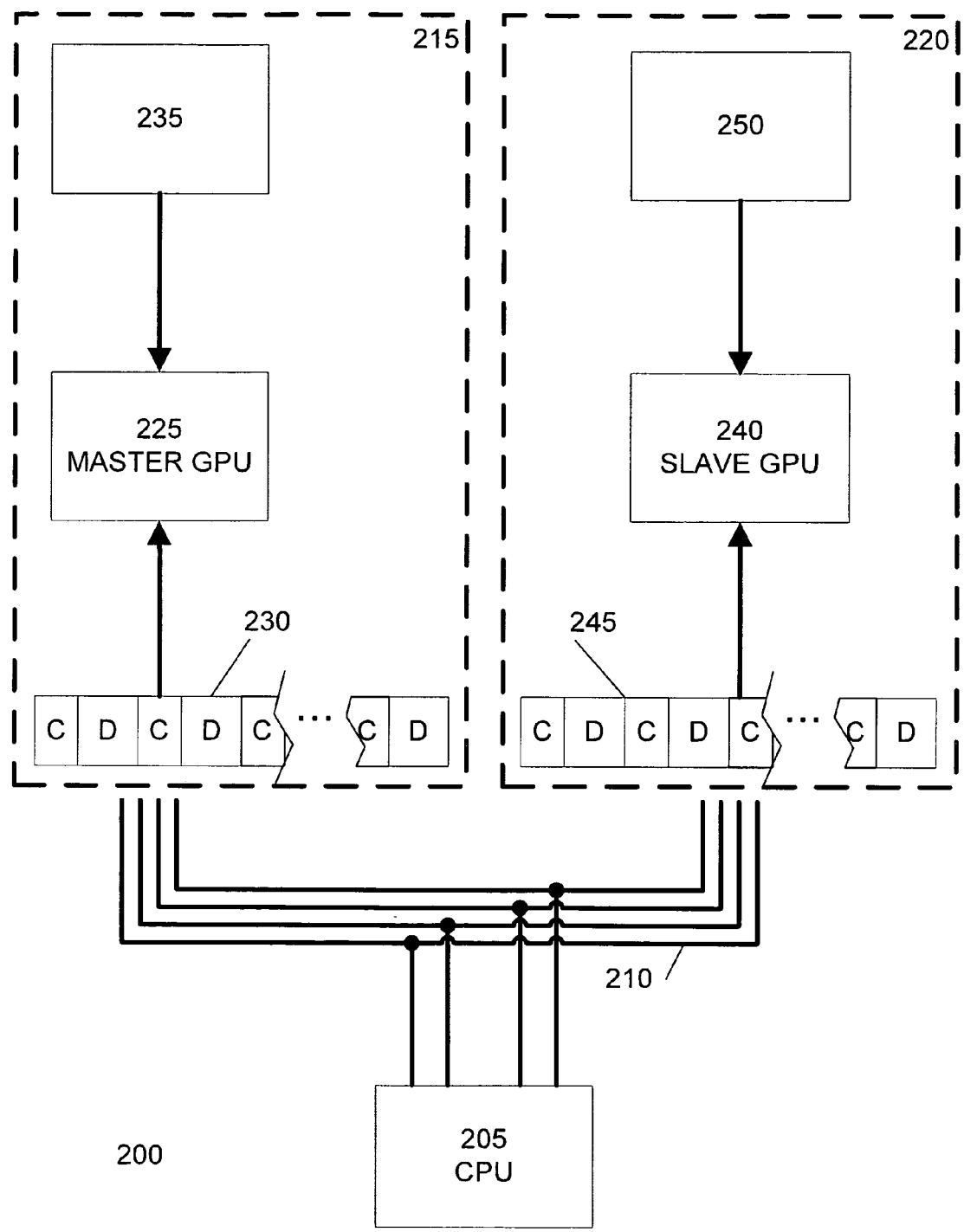
FIG. 2 is a block diagram of a computer system including two graphics processing subsystems operating in parallel.

FIG. 2 is a block diagram of a computer system 200 including two graphics processing subsystems operating in parallel. CPU 205 is connected via bus 210 with graphics devices 215 and 220. Bus 210 may be comprised of multiple data buses forming a data path between the CPU 205 and graphics devices 215 and 220. An embodiment of bus 210 includes a CPU bus connected between the CPU 205 and a bus controller (not shown), and a graphics bus, such as PCI-X, connected between the bus controller and graphics devices 215 and 220.

Graphics device 215 includes a graphics processing unit, referred to as a master GPU 225. The master GPU 225 serves as the primary graphics device recognized by the system 200, and in an embodiment can be connected with a primary display device (not shown). The master GPU 225 receives rendering commands and data 230 from the CPU 205. In an embodiment, the rendering commands and data 230 are stored in additional memory 145? (as defined in FIG. 1) associated with the master GPU 225. In an alternate embodiment, rendering commands and data 230 are stored in system memory (as in memory 110 in FIG. 1) and retrieved as needed by master GPU 225. In response to the rendering commands and data 230, master GPU 225 performs various rendering operations. Included in these rendering operations are texture mapping operations, for which the master GPU 225 accesses texture map 235. In an embodiment, texture map 235 is stored in additional memory 145? associated with master GPU 225 to facilitate rapid memory access.

Graphics device 220 is similar to graphics device 215, having a slave GPU 240, a set of rendering commands and data 245, and a texture map 250. In an embodiment, the slave GPU 240 is not recognized by the system 200 as a display device. Instead, slave GPU 240 is operated in parallel with master GPU 225 to improve the graphics performance of the primary graphics device. In this parallel processing mode of operation, slave GPU 240 is not connected with a display device (not shown) directly; instead, its output is sent to graphics device 215 to be output. In a further embodiment, an alternate mode of operation of system 200 recognizes graphics device 220 as an auxiliary display device. In this alternate mode of operation, the output of graphics device 220 goes to an auxiliary display. The alternate mode of operation allows system 200 to utilize two independent display devices.

In the parallel processing mode of operation, graphics devices 215 and 220 will typically require much of the same rendering commands and data and texture maps. For example, if graphics devices 215 and 220 are rendering different portions of the same surface, both graphics devices will need to access the same texture map. Additionally, the same set of rendering commands and data, including rendering commands specific to only one of graphics devices, can be sent to both graphics devices. A set device mask (SDM) command included in the set of commands will instruct the other graphics device to skip over the rendering commands inapplicable to that device. The operation and application of SDM commands is described in related patent application entitled Programming Multiple Chips from a Command Buffer," U.S. patent application Ser. No. 10/639,893, filed Aug. 12, 2003.

In prior implementations of parallel processing modes of operation, the CPU 205 would be required to transfer copies of the rendering commands and data and texture maps to graphics devices 215 and 220 in two separate operations. This implementation wastes CPU cycles by requiring data to be transferred twice. More importantly, this prior implementation will often saturate the capacity of the bus 210 with data transfers. For example, a typical Intel Pentium 4 CPU bus has a bandwidth of approximately 3.2 gigabytes (GB) per second. A PCI-X graphics bus used to connect an embodiment of system 200 with graphics devices 215 and 220 allocates bandwidth of 1.5 GB per second to each graphics device. Thus, if graphics devices 215 and 220 both using the maximum bandwidth, then they will require from the CPU 205 a bandwidth of 3 GB per second, essentially saturating the CPU bus. Furthermore, adding additional graphics devices will not improve performance substantially because the CPU bus will be unable to transfer data fast enough to support the additional graphics devices.

Figure 3:
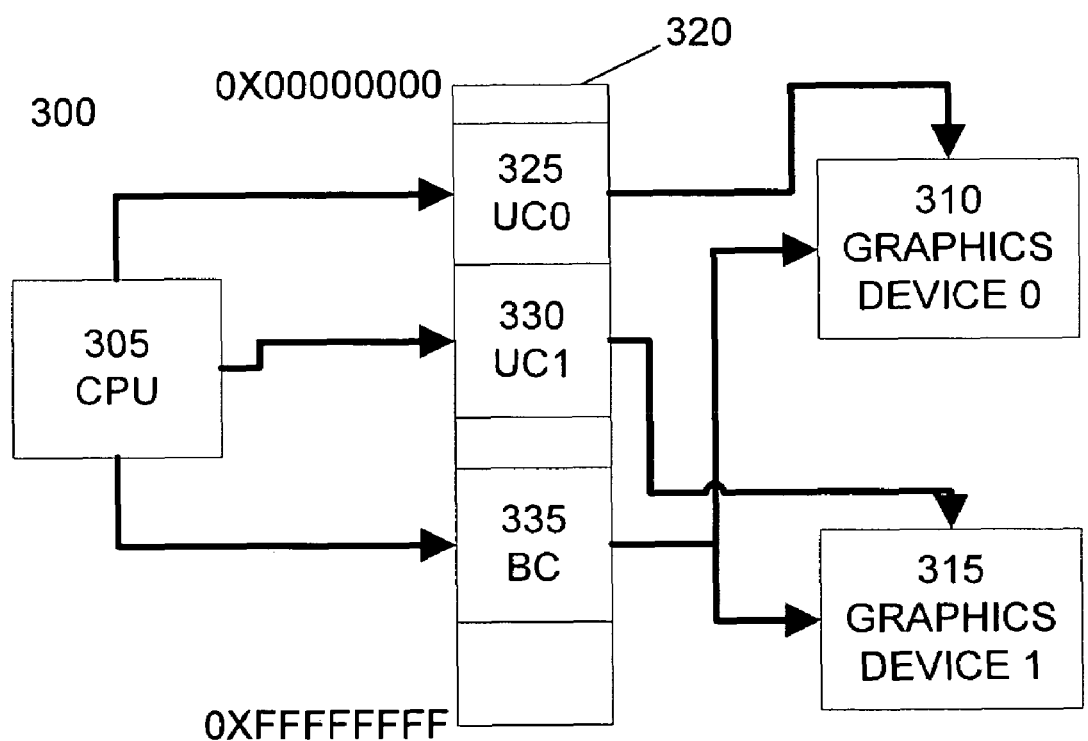
FIG. 3 illustrates a system for transferring data to and from two or more graphics processing subsystems in parallel according to an embodiment of the invention.

FIG. 3 illustrates a system 300 for transferring data to and from two graphics processing subsystems in parallel according to an embodiment of the invention. System 300 uses memory-mapped I/O to communicate rendering commands and data between the CPU 305 and the graphics devices 310 and 315. In memory-mapped I/O, commands and data written to a predetermined range of memory addresses are communicated to the graphics devices 310 and 315, and conversely, data from the graphics devices 310 and 315 can read from the predetermined range of memory addresses by the CPU 305.

Memory map 320 graphically represents the range of available memory addresses in system 300. Memory map 320 contains several apertures, or ranges of memory addresses used to communicate with the graphics devices 310 and 315. Unicast apertures 325 and 330 are adapted to distribute commands and data to graphics device 310 and 315, respectively. Commands and data written to a given unicast aperture will only be distributed to the graphics device associated with that unicast aperture. Similarly, data read from a unicast aperture will retrieve data from the associated graphics device.

In addition to the unicast apertures 325 and 330, the memory map 320 also includes broadcast aperture 335. Broadcast aperture 335 enables the CPU 305 to communicate with all of the graphics devices in the system 300 simultaneously. Commands and data written to the broadcast aperture 335 are distributed to graphics devices 310 and 315, as well as any other graphics devices in the system 300. In an embodiment, data read from the broadcast aperture 335 will retrieve data from the graphics device designated as the master or primary graphics device.

Figure 4:
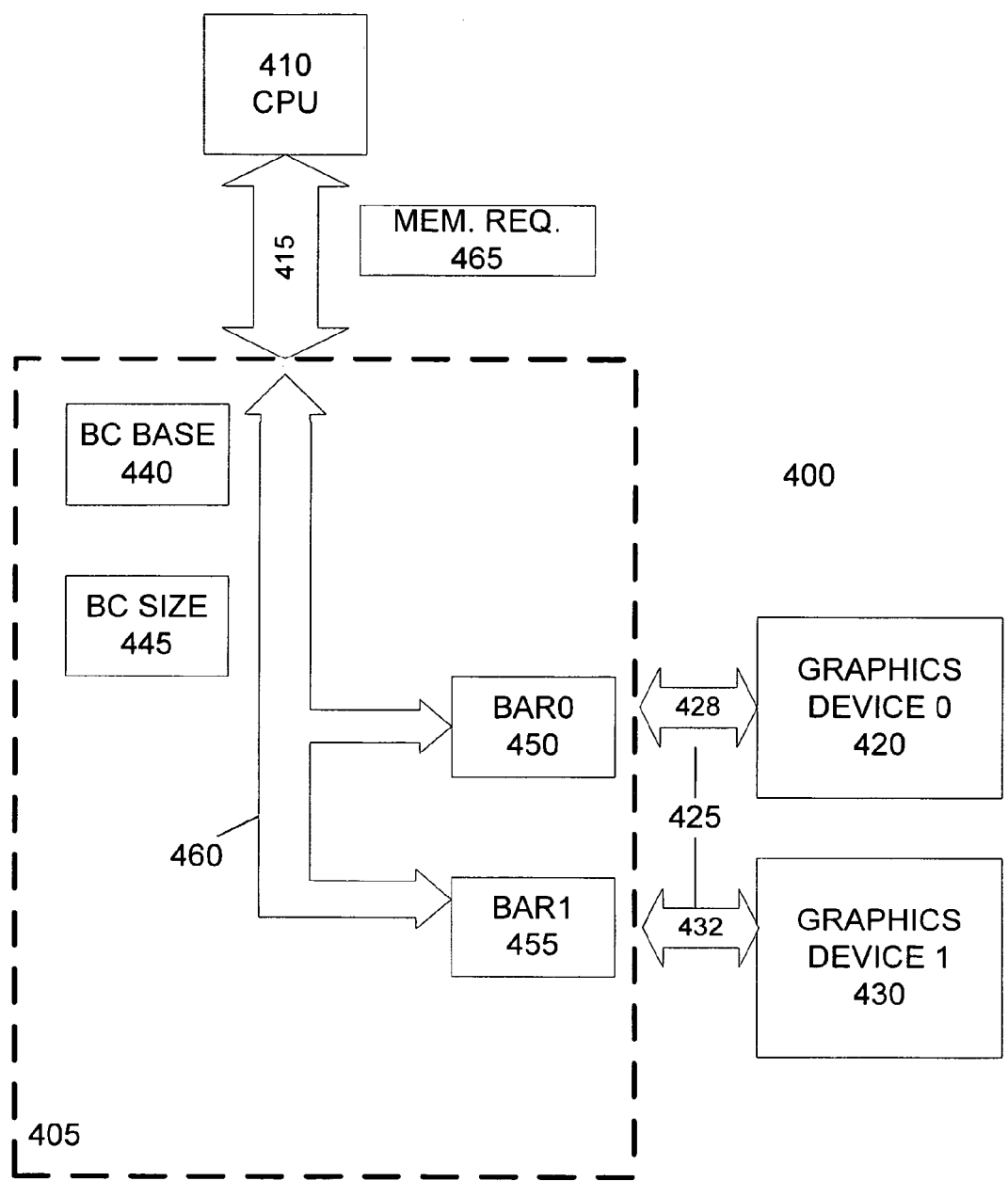
FIG. 4 illustrates a bridge for transferring data to and from two or more graphics processing subsystems in parallel according to an embodiment of the invention.

An embodiment of the invention includes a bridge adapted to copy data written to the broadcast aperture 335 to each graphics device in the system 300. FIG. 4 illustrates a bridge for transferring data to and from two or more graphics processing subsystems in parallel according to an embodiment of the invention. System 400 includes bridge 405 connected with CPU 410 via a CPU bus 415 and with two graphics devices 420 and 430 via graphics bus 425. In an embodiment, bridge 405 is integrated into a component of the core logic of the system 400, such as in a Northbridge or Southbridge system controller.

Bridge 405 includes four registers 440, 445, 450, and 455 for storing bridge configuration information. Broadcast aperture base register 440 stores the physical memory address for the broadcast aperture. In an embodiment, the physical memory address of the broadcast aperture is determined by the system BIOS during system startup. Broadcast aperture size register 445 stores the size of the broadcast aperture. In an embodiment, a user designates the size of the broadcast aperture using the computer system BIOS configuration utility. For example, the BIOS configuration utility can include a menu option for specifying the broadcast aperture size, such 128, 256, or 512 megabytes. The size of the broadcast aperture is stored in the computer system CMOS memory and can be retrieved during system initialization and stored in register 445.

In a further embodiment, the menu option allows users to disable the broadcast aperture in systems using multiple graphics devices to drive multiple independent displays and not needing a parallel processing mode of operation. Disabling the broadcast aperture reduces the amount of address space consumed for memory-mapped I/O, potentially improving system performance.

Base address registers 0 and 1 (BAR0 and BAR1, respectively) 450 and 455 store the physical memory addresses for the unicast apertures associated with graphics devices 420 and 430, respectively. In an embodiment, discussed in detail below, the base address registers 450 and 455 are configured by a graphics driver communicating with a bridge driver. In a further embodiment, bridge 405 includes additional base address registers, which allows for the inclusion of additional graphics devices.

Upon receiving a memory access request 465 from the CPU 410, bridge 405 compares the memory address included in the memory access request 465 with the range of physical memory addresses defined by the values of register 440 and 445. If the memory address is within the broadcast aperture, for example between the value of the broadcast base register 440 and the sum of the value of the broadcast base register 440 and the broadcast size register 445, the bridge initiates a memory broadcast operation. In a further embodiment, a mask value associated with the broadcast aperture is used to prevent memory access requests from overwriting reserved portions of the memory associated with each graphics device.

In another embodiment, the bridge 405 is interfaced with a direct memory access (DMA) controller (not shown). In this embodiment, the CPU 410 instructs the DMA controller to transfer data to the broadcast aperture. The DMA controller retrieves the data from a source memory address and writes the data to a destination memory address in accordance with the instructions provided by the CPU 410. The bridge 405 examines the destination address in the DMA request to determine whether the data is within the broadcast aperture, as described above.

For a memory address falling within the broadcast aperture, an internal data bus and broadcast logic elements 460 strip off the high order address bits of the memory address and forms two unicast memory access requests. Each memory access request substitutes the unicast physical memory address values in registers 450 or 455 for the removed address bits. In a further embodiment, bridge 405 allows for more than 32 address bits, for example enabling a 48-bit or a 64-bit addressing scheme. The greater number of address bits minimizes the effect of the consumption of address space by the broadcast aperture. In an implementation of this embodiment, the base address registers 450 and 455 include only the high-order address bits for a unicast physical memory address, such as bits 47-16. By reserving the lower 16 bits of the memory address, this ensures that the unicast physical memory address is aligned with 64 KB values, as required by many typical CPUs.

The two unicast memory requests are then communicated to their respective graphics devices 420 and 425 via the graphics bus 425. In an embodiment, graphics bus 425 includes two independent communication channels 428 and 432, allowing the unicast memory access requests to be issued in parallel. Alternatively, graphics bus 425 includes a single communication channel and the bridge issues the unicast memory access request in series. Regardless of the implementation of graphics bus 425 and the number of graphics devices, system 400 only requires the CPU 410 to issue a single memory access request to communicate with all of the graphics devices. This prevents multiple graphics devices from saturating the CPU bus 415 and avoids wasting CPU cycles to execute redundant memory transfers.

Figure 5:
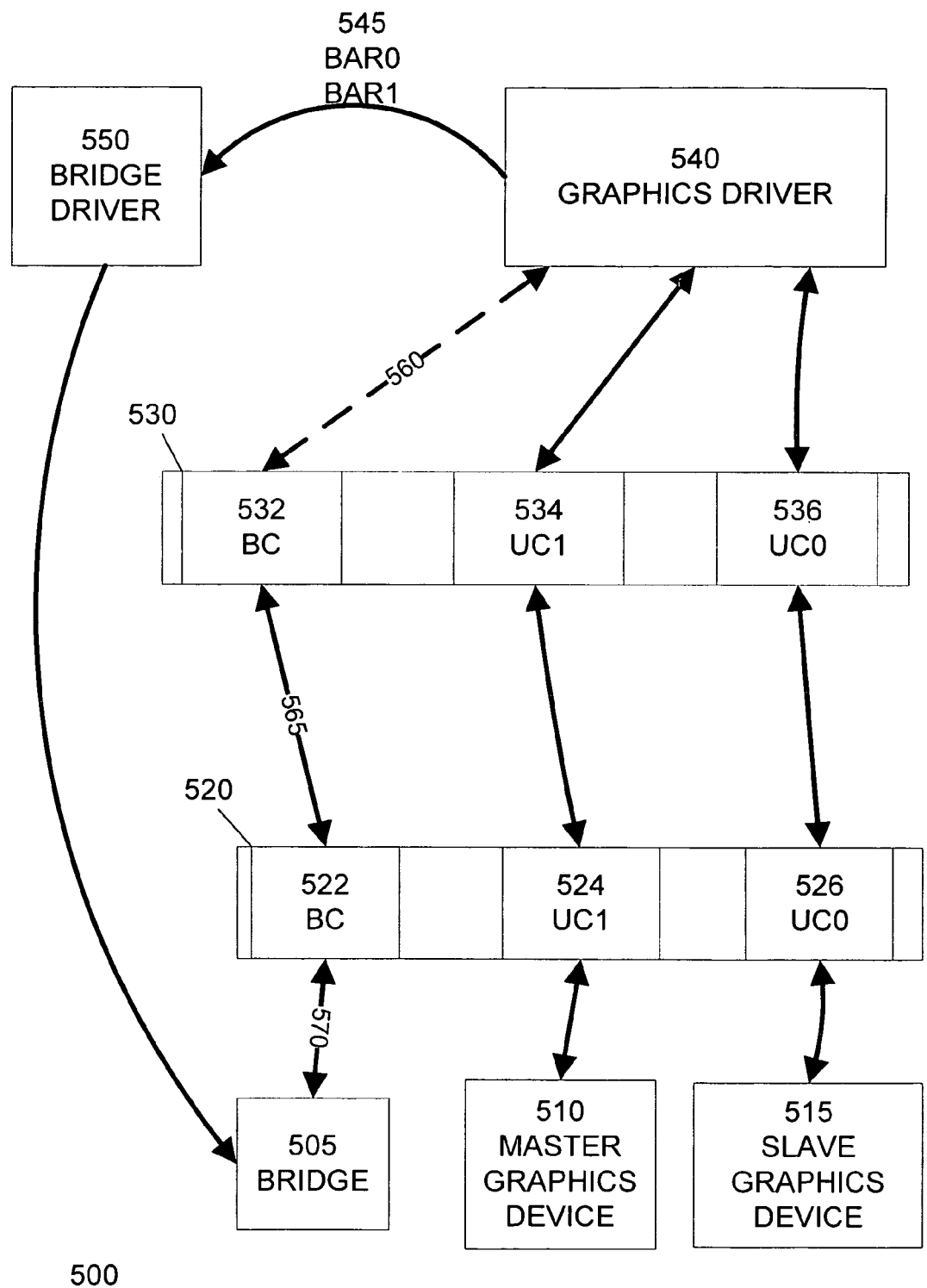
FIG. 5 illustrates a system for configuring a bridge for transferring data to and from two or more graphics processing subsystems in parallel according to an embodiment of the invention.

In order for bridge 405 to function properly, registers 440, 445, 450, and 455 must be properly configured. FIG. 5 illustrates a system 500 for configuring a bridge for transferring data to and from two or more graphics processing subsystems in parallel according to an embodiment of the invention. During system 500 initialization, the system BIOS detects bridge 505 and graphics device 510 and 515. The BIOS configures the physical memory address space 520 to allocate broadcast aperture 522 for bridge 505 and unicast apertures 524 and 526 for graphics devices 510 and 515, respectively. In an embodiment, the broadcast base address is determined by the BIOS and the broadcast aperture size is determined from configuration information stored in the system 500 CMOS.

Following system initialization, the operating system, such as Microsoft Windows, is loaded. During the initialization of the operating system, the apertures defined in the physical memory address space 520 are mapped to a virtual memory address space 530 defined by the operating system. In the virtual memory address space 530, virtual broadcast aperture 532 corresponds to physical broadcast aperture 522 and virtual unicast apertures 534 and 536 correspond to physical unicast apertures 524 and 526, respectively.

Following the operating system initialization, the space for the broadcast apertures in both the physical address space 520 and the virtual address space 530 has been allocated by the system. However, the configuration registers of the bridge 505 do not contain the appropriate values, and hence the broadcast aperture is non-functional. To enable the broadcast aperture, a bridge driver 550 is loaded by the operating system. Bridge driver 550 automatically retrieves the broadcast aperture base address and broadcast aperture size values from the system and configures the appropriate registers of the bridge 505.

In an embodiment, the parallel mode of operation for multiple graphics devices is disabled by default. This allows multiple graphics devices to drive different displays if desired by the user. If a user (or an application) desires increased graphics performance on a single display, the user or application signals to the graphics driver 540 to enable the parallel mode of operation. In response to this request, the graphics driver 540 retrieves the unicast aperture base address values for the graphics devices in the system. In an embodiment, these values are the physical address values for the unicast apertures 524 and 526 in the physical address space 520. The graphics driver 540 communicates these base address values 545 to the bridge driver 550 using an operating system communication channel, such as IOCTL. The bridge driver 550, upon receiving the base address values 545 for the unicast apertures 524 and 526, communicates these values to bridge 505, thereby configuring the values of the BAR0 and BAR1 registers of bridge 550 and activating the broadcast aperture. Similarly, upon request from the graphics driver 540, the bridge driver 550 can deactivate the broadcast aperture.

In an embodiment, the bridge driver 550 is only used to configure the bridge 505 and activate the broadcast aperture. Once the broadcast aperture is activated, graphics driver 540 can communicate directly 560 with virtual broadcast aperture 532, which in turn is mapped 565 by the operating system to the physical broadcast aperture 522. The physical broadcast aperture 522 then directs communications 570 to the bridge 505, which in turn issues separate communications to graphics devices 510 and 515 through unicast apertures 524 and 526, respectively.

Figure 6A:
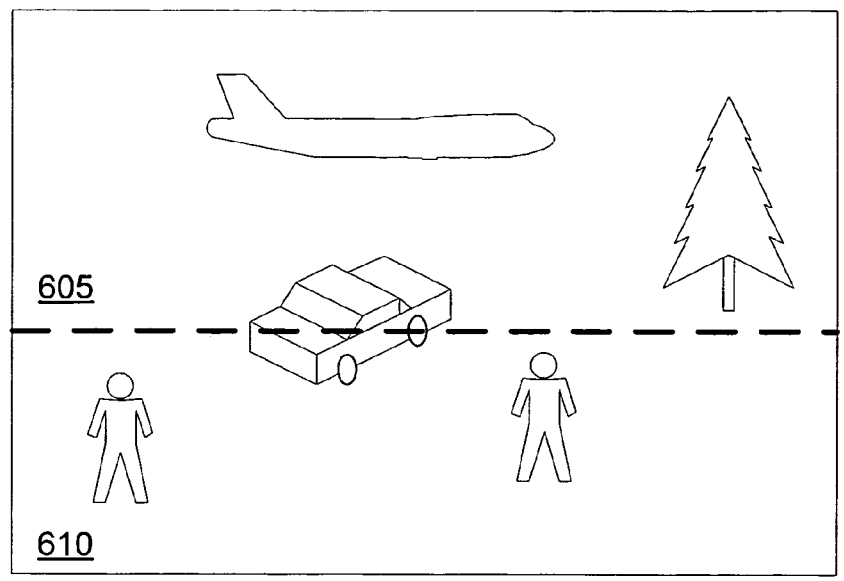
FIGS. 6A and 6B illustrate two different parallel rendering techniques that can be implemented with an embodiment of the invention.
Figure 6B:
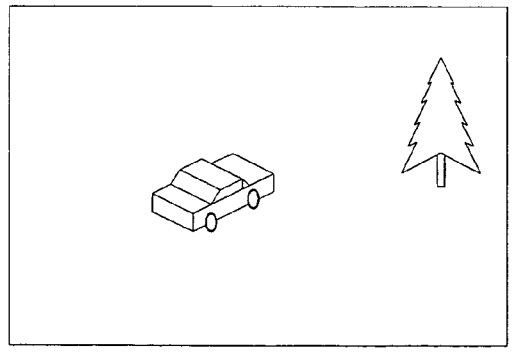
Figure 6B:
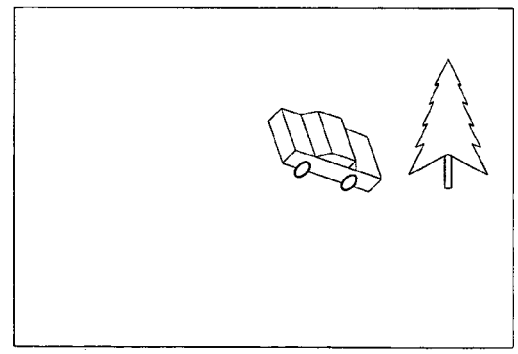

FIGS. 6A and 6B illustrate two different parallel rendering techniques that can be implemented with an embodiment of the invention. FIG. 6A illustrates a split frame rendering technique, in which different portions of frame 600 are assigned to different graphics devices. For example, portion 605 is assigned to a first graphics device and portion 610 is assigned to a second graphics device. Portions 605 and 610 are rendered in parallel on the first and second graphics devices, respectively, and then combined into a final output image.

FIG. 6B illustrates an alternate frame rendering technique, in which successive frames are assigned to different graphics devices. For example, frame 650 is assigned to a first graphics device and frame 655 is assigned to a second graphics device. The first and second graphics devices render their respective frames in parallel, with the resulting rendered frames being displayed successively.

Figure 7A:
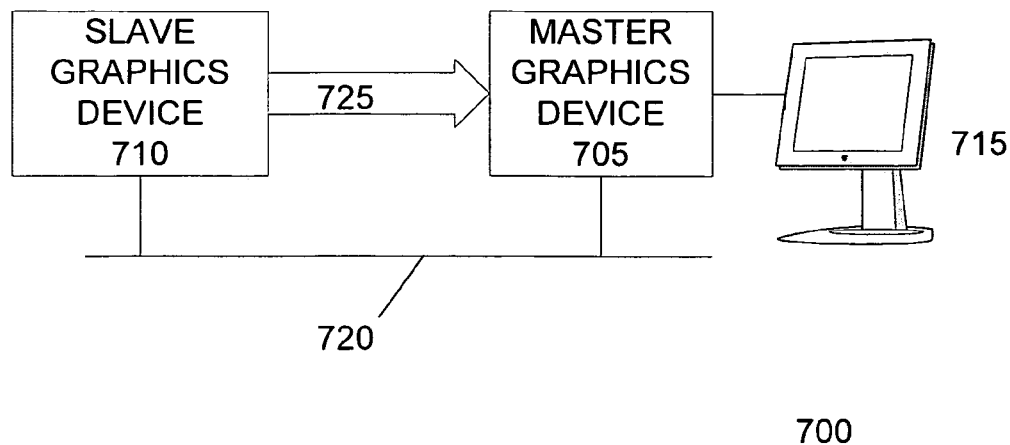
FIGS. 7A and 7B illustrate implementations of parallel rendering techniques according to an embodiment of the invention.
Figure 7B:
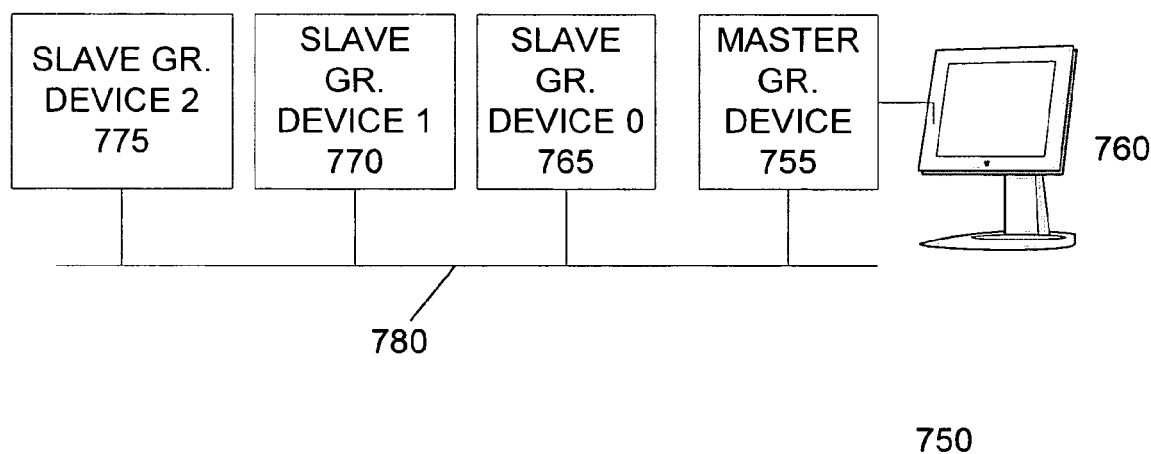

FIGS. 7A and 7B illustrate implementations of parallel rendering techniques according to an embodiment of the invention. FIG. 7A illustrates an implementation 700 having a master graphics device 705 connected to a display device 715 and a slave graphics device 710. Master and slave graphics devices 705 and 710 are connected with the rest of the computer system via graphics bus 720. In this implementation, the rendered image from slave graphics device 710, in the case of alternate frame rendering, or a portion of a rendered image, in the case of split frame rendering, is communicated via a digital video connection 725 to master graphics device 705. Master graphics device 705 outputs the image (or portion thereof) received via the digital video connection 725 to display device 715. In the case of split frame rendering, the master graphics device 705 combines the received image with a portion of the image rendered by master graphics device 705.

FIG. 7B illustrates an implementation 750 having a master graphics device 755 connected with a display device 760 and additional slave graphics devices 765, 770, and 775. Graphics devices 755, 765, 770, and 775 operate in parallel to render different portions of an output image or different output images and are connected with the rest of the computer system and with each other via graphics bus 780. Following the rendering of output images or the portions thereof, implementation 750 uses blit commands to copy output images or portions thereof from the slave graphics devices 765, 770, and 775 to display memory associated with master graphics device 755 via the graphics bus 780. The copied images then displayed by master graphics device 755 on display device 760. In the case of split frame rendering, the master graphics device 755 combines the image portions from slave graphics devices 765, 770, and 775 with a portion of the image rendered by master graphics device 755.

In a further embodiment, split frame rendering balances the load assigned to each graphics device by dividing the output image into portions having a size (e.g. a number of pixels) inversely proportional to their rendering complexity. To minimize the amount of data transmitted over graphics bus 780 by blit operations, an embodiment renders the most complex portions, which are the smallest in size, with the slave graphics devices 765, 770, and 775. As these portions are the smallest in size, the amount of data needed to be moved via graphics bus 780 is minimized. In another embodiment, anti-aliasing is applied locally by each graphics device to its respective rendered image or portion thereof prior to transferring the rendered image to the master graphics device 755. This embodiment reduces the number of pixels, and hence the amount of data, sent over graphics bus 780.

Figure 8:
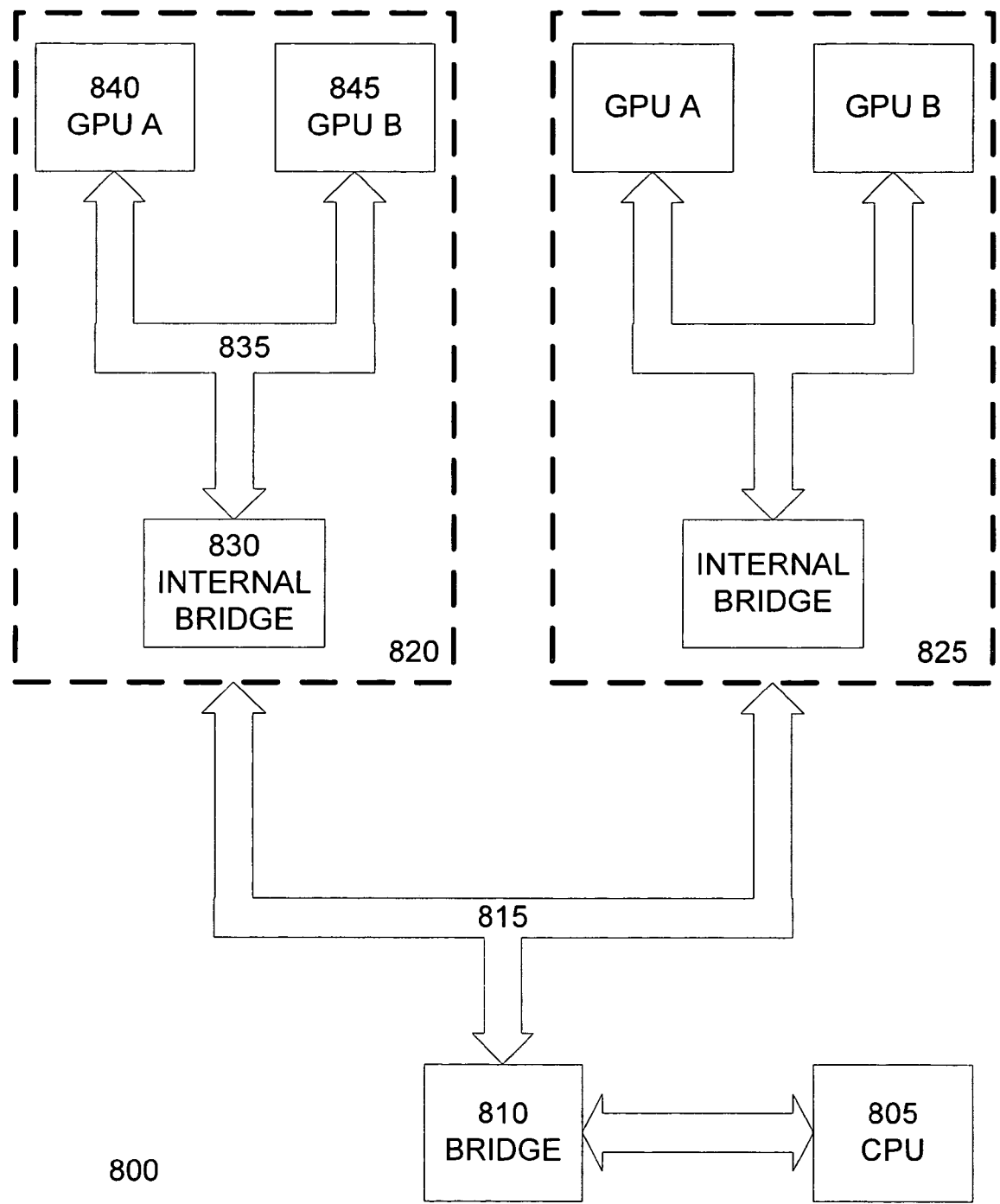
FIG. 8 illustrates a cascade implementation having four graphics processing units operating in parallel according to an embodiment of the invention.

FIG. 8 illustrates a cascade implementation 800 having four graphics processing units operating in parallel according to an embodiment of the invention. Implementation 800 includes a CPU 805 connected with a bridge 810 via a CPU bus. As discussed above, bridge 810 facilitates a broadcast aperture enabling data transfers to multiple graphics devices. Here, graphics devices 820 and 825 are connected via graphics bus 815 with bridge 810. Graphics device 820 includes an internal bridge 830 adapted to transfer data to graphics processing units 840 and 845. Graphics device 825 includes similar components. The internal bridges in graphics devices 820 and 825 hide the dual graphics processing units, so that from the perspective of bridge 810, graphics devices 820 and 825 each appear to have only a single graphics processing unit.

Implementation 800 uses a combination of split frame rendering and alternate frame rendering to improve rendering performance. A first frame is rendered by graphics device 820 and a second frame is rendered by graphics device 825. Within graphics device 820, graphics processing units 840 and 845 operate in parallel to render different portions of the assigned frame. Similarly, the graphics processing units of graphics device 825 operate in parallel to render different portions of the second frame. Rendered frames are displayed as described in implementations 700 or 750, with either graphics device 820 or 825 serving as the master graphics device connected with a display device.

This invention provides an efficient system for transferring data to multiple graphics devices without unduly consuming system resources. In a typical embodiment, only a single memory aperture is needed to transfer rendering commands and data to any number of graphics devices. Although the invention has been discussed with respect to specific examples and embodiments thereof, these are merely illustrative, and not restrictive, of the invention. Though the invention is discussed with reference to several parallel rendering schemes, the invention can be used in any application where different hardware devices are used to render images. For example, some content may be encrypted for security or for digital rights management. A decryption-capable graphics device can be programmed to render the encrypted content, while other graphics devices in the system render the non-encrypted content. Thus, the scope of the invention is to be determined solely by the claims.

What is claimed is:

1. A method of transferring data between a processor and a plurality of graphics devices, the method comprising:

receiving allocation data for a broadcast aperture in a physical address space;

configuring a bridge with a first set of configuration data, wherein the bridge is adapted to facilitate transferring data between a processor and a plurality of graphics devices;

configuring the bridge with a second set of configuration data, thereby activating the broadcast aperture;

receiving, by the bridge, a set of data via the broadcast aperture; and creating, by the bridge in response to receiving the set of data via the broadcast aperture, a plurality of unicast memory requests, each unicast memory request corresponding to one of the plurality of graphics devices, wherein each of the plurality of unicast memory requests includes a destination memory address that is determined by:

stripping off a set of high order bits from a memory address associated with the set of data; and substituting a set of high order bits associated with a physical memory address of one of the plurality of graphics devices.

2. The method of claim 1, wherein configuring a bridge with a first set of configuration data further comprises retrieving at least a portion of the first set of configuration data including a broadcast aperture size from a system configuration memory.

3. The method of claim 2, wherein the broadcast aperture size is set by a user via a BIOS configuration utility.

4. The method of claim 1, wherein configuring the bridge with a second set configuration data comprises receiving at least a portion of the second set of configuration data from a graphics driver associated with the plurality of graphics devices.

5. The method of claim 1, wherein at least one of the plurality of graphics devices includes a plurality of graphics processing units.

6. The method of claim 1, wherein the processor executes a graphics driver adapted to communicate a set of rendering commands and rendering data to the plurality of graphics devices via the broadcast aperture.

7. The method of claim 6, wherein the set of rendering commands directs a first portion of the plurality of graphics devices to render a first portion of a frame and directs a second portion of the plurality of graphics devices to render a second portion of the frame.

8. The method of claim 6, wherein the set of rendering commands directs a first portion of the plurality of graphics devices to render a first frame and directs a second portion of the plurality of graphics devices to render a second frame.

9. The method of claim 6, wherein the set of rendering commands direct a first portion of the plurality of graphics devices to transfer rendered image data comprising at least a portion of a frame to one of the plurality of graphics devices connected with a display device.

10. The method of claim 9, wherein the first portion of the plurality of graphics devices is adapted to transfer rendered image data to one of the plurality of graphics devices connected with a display device via a digital video connection.

11. The method of claim 9, wherein the first portion of the plurality of graphics devices is adapted to transfer rendered image data to the one of the plurality of graphics devices connected with a display device via a graphics bus using a blit operation.

12. The method of claim 11, wherein the rendered image data includes an anti-aliased version of at least a portion of a frame.

13. The method of claim 11, wherein the rendered image data is associated with a complex portion of a frame.

14. An apparatus for transferring data to a plurality of graphics devices, the apparatus comprising:

a graphics device interface adapted to communicate a set of data with each of the plurality of graphics devices; and a graphics device broadcast unit responsive to the set of data received via a broadcast aperture, wherein in response to receiving the set of data via the broadcast aperture, the graphics device broadcast unit is adapted to communicate a copy of the set of data with each of the plurality of graphics devices, wherein the graphics device broadcast unit is configured to create a plurality of unicast memory requests, each unicast memory request corresponding to one of the plurality of graphics devices, and wherein each of the plurality of unicast memory requests includes a destination memory address, the destination address determined by stripping off a set of high order bits from a memory address associated with the set of data and substituting a set of high order bits associated with a physical memory address of one of the plurality of graphics devices.

15. The apparatus of claim 14, wherein the graphics device broadcast unit is adapted to receive the set of data from a processor via the broadcast aperture.

16. The apparatus of claim 14, further including a direct memory access transfer unit adapted to retrieve the set of data from a memory and to communicate the set of data to the graphics device broadcast unit via the broadcast aperture.

17. The apparatus of claim 14, wherein the graphics device broadcast unit includes a broadcast aperture base address register adapted to store a memory address associated with the broadcast aperture.

18. The apparatus of claim 17, further adapted to receive the memory address associated with the broadcast aperture from a bridge driver.

19. The apparatus of claim 14, wherein the graphics device broadcast unit include a broadcast aperture size register adapted to store a size value associated with the broadcast aperture.

20. The apparatus of claim 19, further adapted to receive the size value associated with the broadcast aperture from a bridge driver, wherein the bridge driver is adapted to retrieve the size value associated with the broadcast aperture from a system configuration memory.

21. The apparatus of claim 14, wherein the graphics device broadcast unit includes a plurality of unicast aperture base address registers corresponding with the plurality of graphics devices, each unicast aperture base address register adapted to store a memory address associated with a unicast aperture of one of the plurality of graphics devices; and wherein the graphics device interface is adapted to communicate a copy of the set of data with the each of plurality of graphics devices via its associated unicast aperture.

22. The apparatus of claim 21, further adapted to receive the memory addresses associated with the unicast apertures of the plurality of graphics devices from a graphics driver via a bridge driver.

* * * * *